(12) United States Patent
Chen et al.

(10) Patent No.: US 11,650,114 B2
(45) Date of Patent: May 16, 2023

(54) TORQUE DETECTION DEVICE

(71) Applicant: Shin Zu Shing Co., Ltd., New Taipei (TW)

(72) Inventors: Shen-Ding Chen, New Taipei (TW); Po-Jung Chen, New Taipei (TW); Ching-Hsiang Hsu, New Taipei (TW); Jeng-Hung Tsai, New Taipei (TW); King-Ho Tsai, New Taipei (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 167 days.

(21) Appl. No.: 17/330,582

(22) Filed: May 26, 2021

(65) Prior Publication Data
US 2022/0381632 A1 Dec. 1, 2022

(51) Int. Cl.
*G01L 5/00* (2006.01)
*G01L 5/24* (2006.01)

(52) U.S. Cl.
CPC .......... *G01L 5/0038* (2013.01); *G01L 5/0042* (2013.01); *G01L 5/24* (2013.01)

(58) Field of Classification Search
CPC ........ G01L 5/0038; G01L 5/0042; G01L 5/24
See application file for complete search history.

(56) References Cited

U.S. PATENT DOCUMENTS

| | | | | |
|---|---|---|---|---|
| 6,718,831 B2* | 4/2004 | Chiapuzzi | ............. | G01L 25/003 73/761 |
| 8,677,836 B2* | 3/2014 | Yu | ........................... | G01L 3/104 73/862.193 |
| 9,702,797 B2* | 7/2017 | Yang | ........................ | G01N 3/22 |
| 10,345,172 B1* | 7/2019 | Seok | ...................... | G01L 5/0042 |
| 2008/0223151 A1* | 9/2008 | Lai | ......................... | G01L 5/0042 73/862.08 |
| 2012/0266693 A1* | 10/2012 | Zhang | ................... | G01L 5/0042 73/862.08 |
| 2013/0160569 A1* | 6/2013 | Yu | ........................... | G01L 3/104 73/862.193 |
| 2015/0260591 A1* | 9/2015 | Wu | ....................... | G01L 5/1627 73/862.041 |

* cited by examiner

*Primary Examiner* — Freddie Kirkland, III
(74) *Attorney, Agent, or Firm* — Alan D. Kamrath; Karin L. Williams; Mayer & Williams PC (57) ABSTRACT

A torque detection device includes a base, a load sensing member, a push member, a transmission module, and a drive module. The push member has a first extension wall and a second extension wall. The transmission module includes two adjustable transmission sets each including a torque transmission part. The torque transmission part respectively rests on the first extension wall and the second extension wall of the push member. The torque transmission part of the transmission module applies a force to push and press the push member reciprocatingly. The push member transmits the force of the torque transmission part to the load sensing member which cooperates with an electronic device to measure the maximum static friction torque of a detected workpiece.

10 Claims, 11 Drawing Sheets

TORQUE DETECTION DEVICE

BACKGROUND OF THE INVENTION

1. Field of the Invention

The present invention relates to a detection device and, more particularly, to a torque detection device eliminating the torque clearance produced during operation by adjusting a transmission member.

2. Description of the Related Art

A torque detection device is used to measure the torque of a pivoting part, such as a screw, a bolt or the like. The torque detection device usually performs a torque test on the pivoting part, including tightening, loosening, torque, and stopping resistance of the pivoting part. A conventional torque detection device comprises a driving mechanism, a transmission mechanism, and a load sensor. The transmission mechanism includes a push member and a bearing. The bearing is mounted in a recess of the push member and has two sides abutting two sidewalls of the recess of the push member. The driving mechanism is connected with the bearing. When the pivoting part is tested, the driving mechanism drives and moves the bearing so that the two sides of the bearing are moved to press the two sidewalls of the recess of the push member reciprocatingly. The push member sends the torque to the load sensor which senses the torque of the pivoting part. Thus, the bearing has a torque transmission function. However, the bearing has a fixed size so that a clearance is easily produced between the bearing and the push member during multiple operations of torque test. In addition, the side width of the bearing is large and easily produces an additional torque during operation so that the torque is not measured precisely when the pivoting part is tested.

BRIEF SUMMARY OF THE INVENTION

In accordance with the present invention, there is provided a torque detection device comprising a base, a load sensing member, a push member, a transmission module, and a drive module. The load sensing member is arranged on the base. The push member has a first extension wall and a second extension wall arranged symmetrically. The first extension wall and the second extension wall are connected and form an abutting portion resting on the load sensing member. The transmission module includes a body and two adjustable transmission sets mounted on two sides of the body. Each of the two adjustable transmission sets includes a torque transmission part and a drive adjusting member. The torque transmission part respectively rests on the first extension wall and the second extension wall of the push member. The drive adjusting member adjusts a tightness between the torque transmission part and the first extension wall and the second extension wall of the push member. The drive module is coupled to the transmission module. The transmission module is driven by the drive module to perform an action. The torque transmission part of the transmission module applies a force to push and press the push member reciprocatingly. The push member transmits the force of the torque transmission part to the load sensing member. Thus, the torque detection device is used to measure the maximum static friction torque of a detected workpiece.

According to the primary advantage of the present invention, the two adjustable transmission sets of the transmission module are operated easily and conveniently to adjust the tightness between the torque transmission part and the first extension wall and the second extension wall of the push member so as to eliminate the torque clearance that is produced during operation, thereby enhancing the precision of measuring the maximum static friction torque of the detected workpiece.

According to another advantage of the present invention, the transmission module is designed to have an equal torque transmission structure so that the torque transmission will not produce a displacement deflection, thereby increasing the precision and decreasing the error of the torque measurement.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-8, a torque detection device in accordance with the preferred embodiment of the present invention comprises a base 10, a load sensing member 20, a push member 30, a transmission module 40, a drive module 50, a fixed member 60, and a housing 70. The fixed member 60 is mounted on the base 10. The load sensing member 20 is supported by the fixed member 60. The load sensing member 20 is suspended from the base 10 by the fixed member 60. The push member 30 rests on the load sensing member 20. The drive module 50 is coupled to the transmission module 40. The transmission module 40 is driven by the drive module 50 to perform an action. The torque transmission part 421 of the transmission module 40 applies a force to push and press the push member 30 reciprocatingly. The push member 30 transmits the force of the transmission module 40 to the load sensing member 20. The load sensing member 20 produces a sensing signal according to the force transmitted by the push member 30 and sends the sensing signal to an external electronic device, so as to obtain the maximum static friction torque of a detected workpiece A. The drive module 50 has a side provided with a motor (not shown).

The fixed member 60 is fixed between the base 10 and the load sensing member 20. The fixed member 60 is provided with a support portion 61 bearing a bottom of the load sensing member 20 to form a leveling and to provide a support effect. Thus, a distance D is defined between the load sensing member 20 and the base 10 so that the load sensing member 20 is leveled to prevent from producing a residual force. The push member 30 has a first extension wall 31 and a second extension wall 32 arranged symmetrically. The first extension wall 31 and the second extension wall 32 are connected and form an abutting portion 33 resting on the load sensing member 20. An open slot 35 is formed between the first extension wall 31 and the second extension wall 32 and is opposite to the abutting portion 33. The open slot 35 reduces the weight of the push member 30 and decreases the torque strength transmitted from the transmission module 40 to the push member 30. A third extension wall 34 extends vertically from the second extension wall 32 and is secured to a side of the load sensing member 20. In the preferred embodiment of the present invention, the push member 30 has a substantially U-shaped structure.

The transmission module 40 includes a body 41 and two adjustable transmission sets 42 mounted on two sides of the body 41. The two adjustable transmission sets 42 have the same structure and are used to transmit the torque of the detected workpiece A and to adjust the torque clearance. The body 41 has a pivot axis (or shaft hole) 411 and has a first transmission arm 412 and a second transmission arm 413 extending from two sides of the pivot axis 411. It is appreciated that, the pivot axis 411 functions as the central position of the driving action so that the first transmission arm 412 and the second transmission arm 413 have the same torque length. Thus, the pivotal torque is transmitted from the pivot axis 411 to the first transmission arm 412 and the second transmission arm 413 at an equal distance. Each of the two adjustable transmission sets 42 includes a torque transmission part 421 and a drive adjusting member 422. The torque transmission part 421 includes a rolling member 4211 and a driven adjusting member 4212. The torque transmission part 421 respectively rests on the first extension wall 31 and the second extension wall 32 of the push member 30. The drive adjusting member 422 adjusts the tightness between the torque transmission part 421 and the first extension wall 31 and the second extension wall 32 of the push member 30. The driven adjusting member 4212 matches the drive adjusting member 422. In the preferred embodiment of the present invention, the driven adjusting member 4212 is a screw, and the drive adjusting member 422 is a nut. The rolling member 4211 is mounted on the driven adjusting member 4212 and distant from the drive adjusting member 422. The rolling member 4211 respectively rests on the first extension wall 31 and the second extension wall 32 of the push member 30. In the preferred embodiment of the present invention, the rolling member 4211 is a rolling ball. In practice, the driven adjusting member 4212 is driven by the drive adjusting member 422 to adjust the tightness between the rolling member 4211 and the first extension wall 31 and the second extension wall 32 of the push member 30. It is noted that, the adjustment extent between the driven adjusting member 4212 and the drive adjusting member 422 is equal to the tightness between the rolling member 4211 and the first extension wall 31 and the second extension wall 32 of the push member 30.

In the preferred embodiment of the present invention, the pivotal torque is transmitted from the pivot axis 411 to the first transmission arm 412 and the second transmission arm 413 at an equal distance. In design of the push member 30, the first extension wall 31 has a thickness more than that of the second extension wall 32. Thus, the different thickness of the first extension wall 31 and the second extension wall 32 is used to adjust the centroid of the torque transmission so that the centroid is located at the middle of the load sensing member 20 to keep the precision, and to prevent rotation of the drive shaft 51 of the drive module 50 from producing deflection, thereby reducing the clearance and the torque loss.

The housing 70 has a receiving space 71. The housing 70 covers the base 10 so that the load sensing member 20, the push member 30, the transmission module 40, and partial of the drive module 50 are housed in the receiving space 71. The housing 70 includes at least two openings 72, two cover plates 73, and a mounting hole 74. The at least two openings 72 are connected to the receiving space 71 and correspond to the push member 30 and the transmission module 40. The drive module 50 has a drive shaft 51 and a mounting portion 52. The drive shaft 51 extends through the mounting hole 74 and is connected with the transmission module 40. In the preferred embodiment of the present invention, the drive shaft 51 is connected with the pivot axis 411 of the body 41. The mounting portion 52 is pivotally connected with the drive shaft 51. The mounting portion 52 is located outside of the housing 70 and is distant from the transmission module 40. A fixture 80 is mounted on the mounting portion 52, and the detected workpiece A is mounted on the fixture 80.

The body 41 further includes at least one retaining hole 414 and at least one retaining member 415. The at least one retaining member 415 extends through the at least one retaining hole 414 and is secured to the drive shaft 51. In the preferred embodiment of the present invention, the at least one retaining member 415 includes a set screw and a nut, and the at least one retaining hole 414 is a screw hole. The set screw is screwed into the screw hole and is moved to press the drive shaft 51. The nut is screwed onto the set screw and located outside of the screw hole. Thus, the at least one retaining member 415 and the at least one retaining hole 414 enhance the stability of operation and the structural strength.

In the preferred embodiment of the present invention, the housing 70 and the fixed member 60 are mounted on the base 10, the third extension wall 34 of the push member 30 is mounted on a side of the load sensing member 20, and the drive module 50 is partially mounted on the housing 70.

Figure 1:
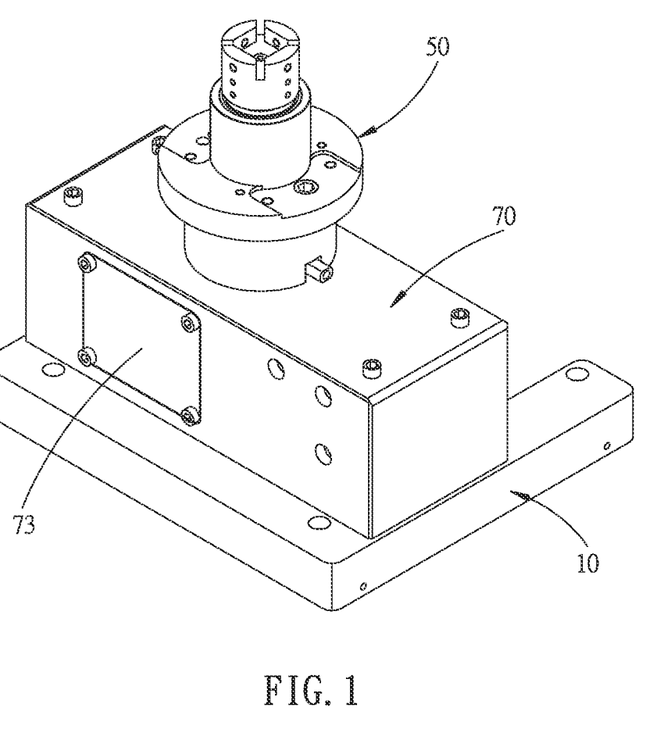
FIG. 1 is a perspective view of a torque detection device in accordance with the preferred embodiment of the present invention.
Figure 2:
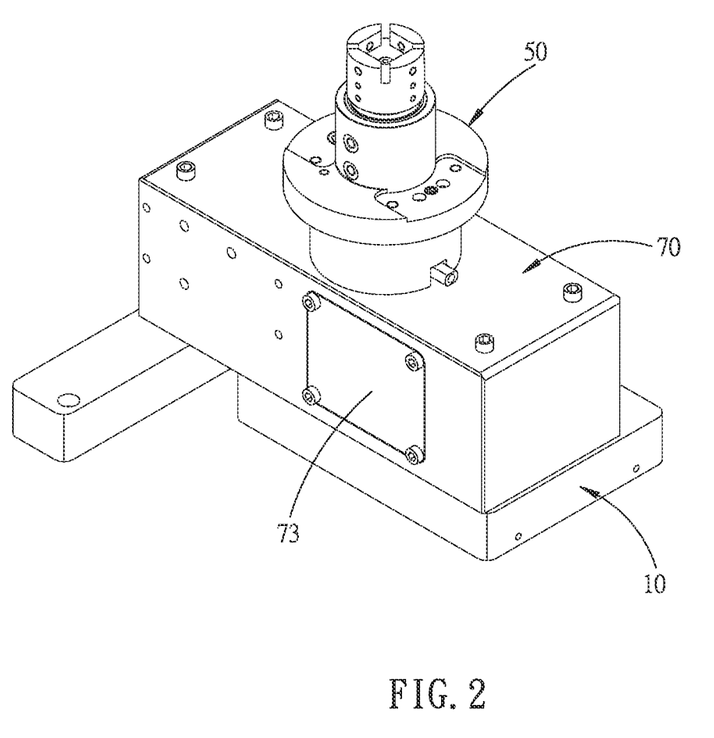
FIG. 2 is another perspective view of the torque detection device in accordance with the preferred embodiment of the present invention.
Figure 3:
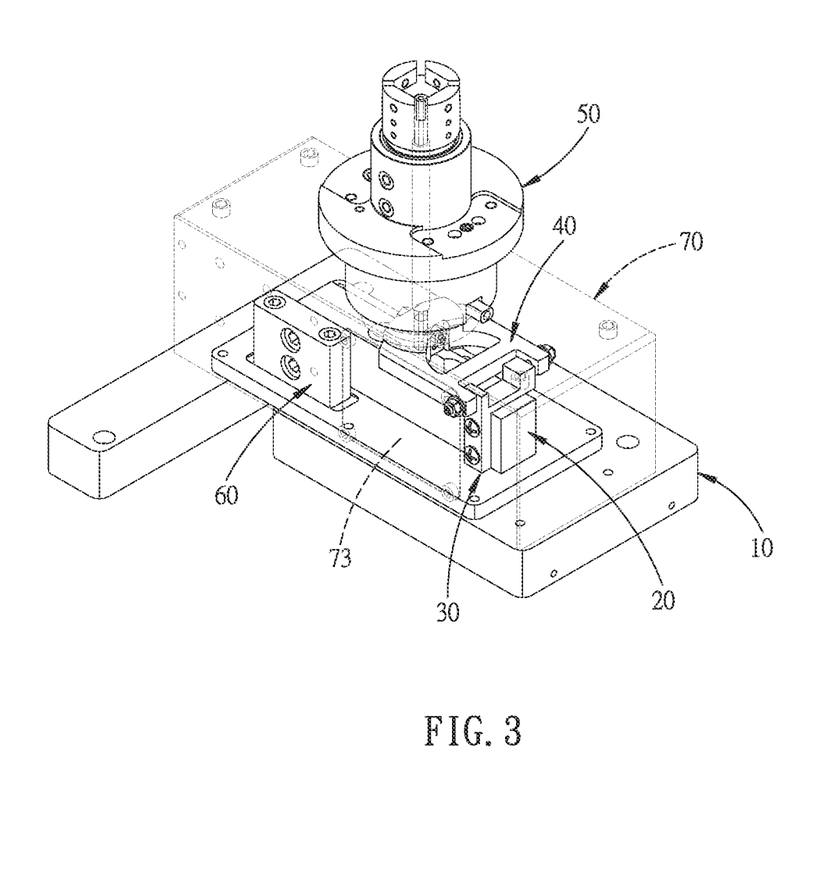
FIG. 3 is a partial perspective view of the torque detection device in accordance with the preferred embodiment of the present invention.
Figure 4:
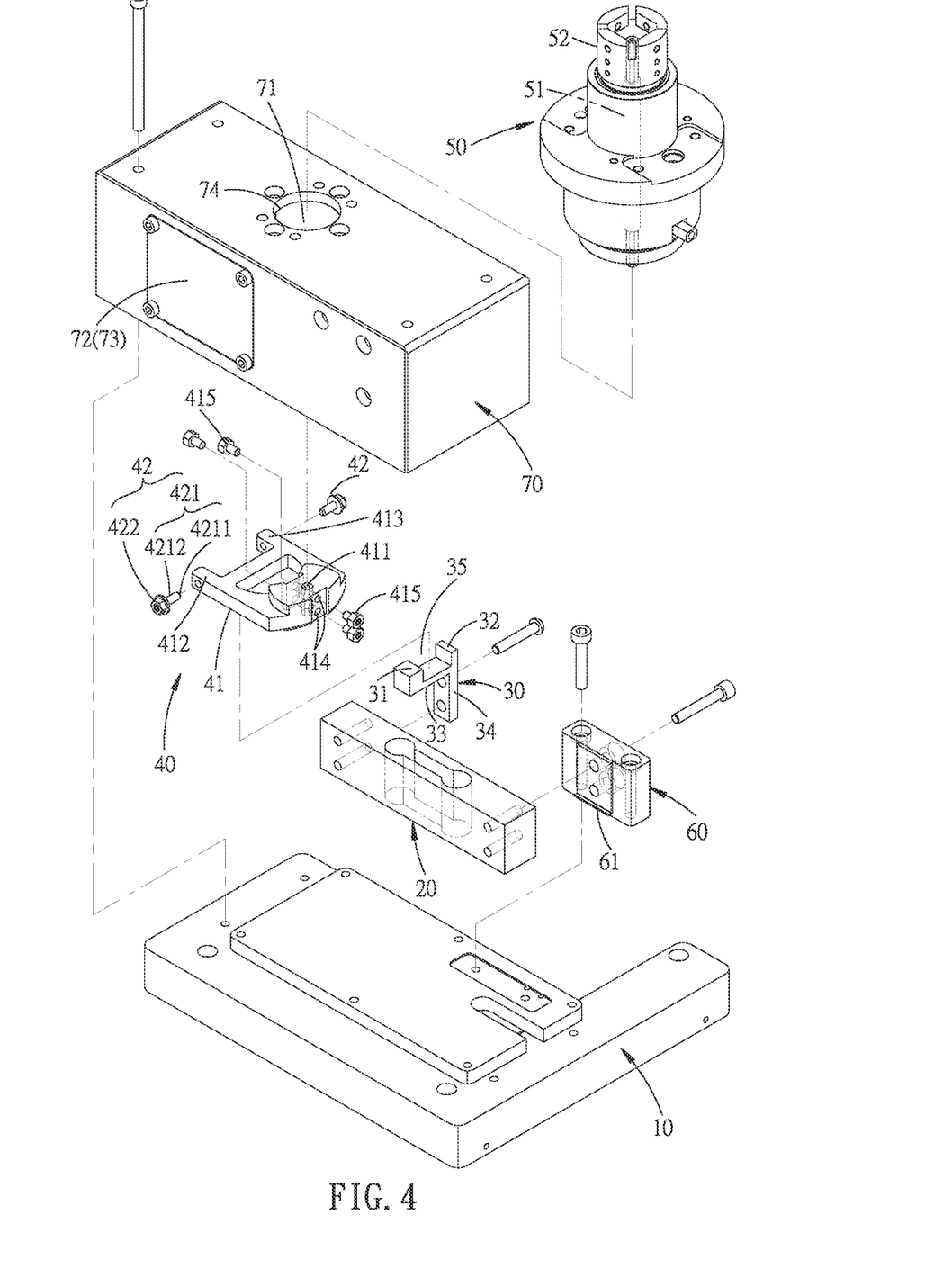
FIG. 4 is an exploded perspective view of the torque detection device in accordance with the preferred embodiment of the present invention.
Figure 5:
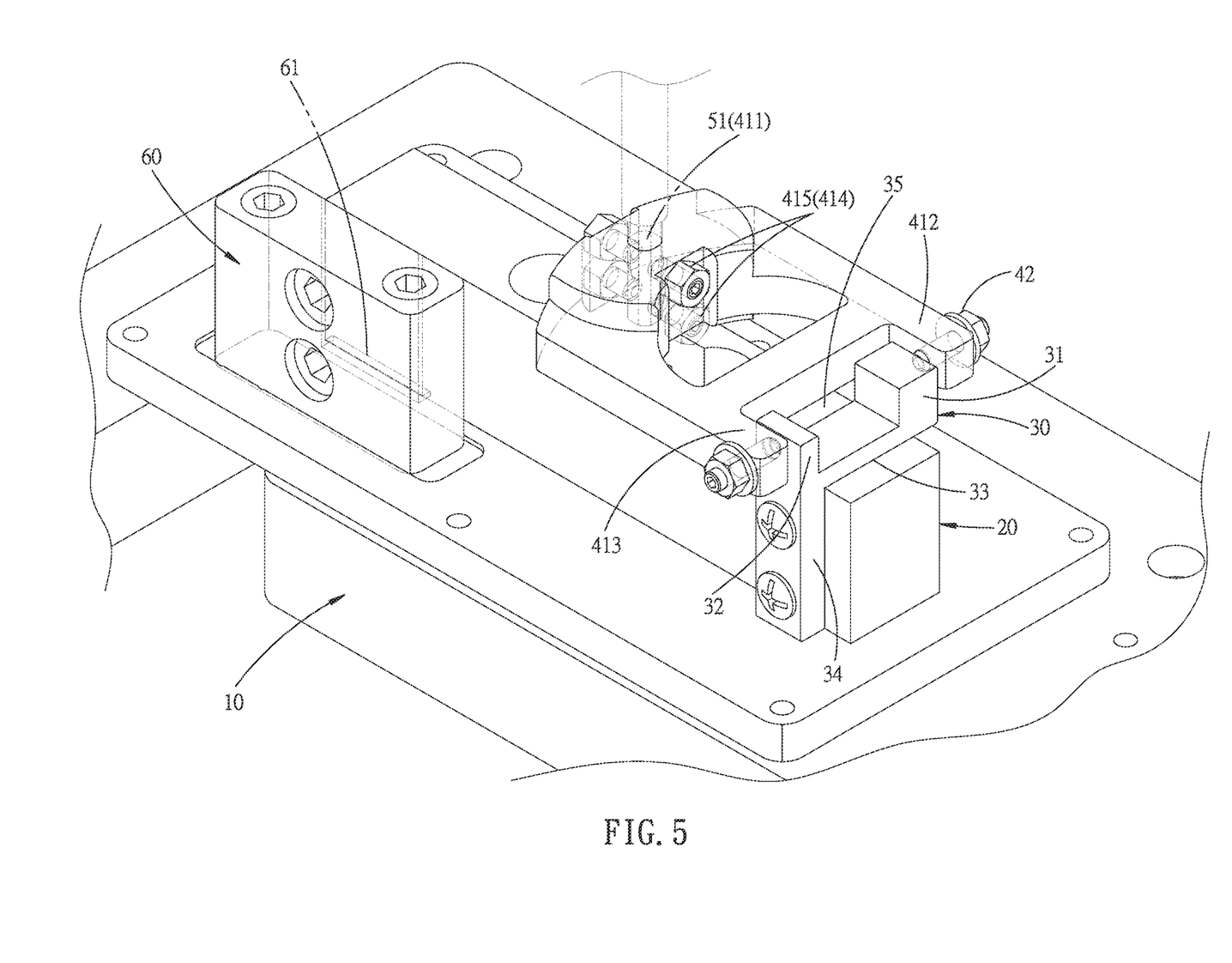
FIG. 5 is a locally enlarged perspective view of the torque detection device in accordance with the preferred embodiment of the present invention.
Figure 6:
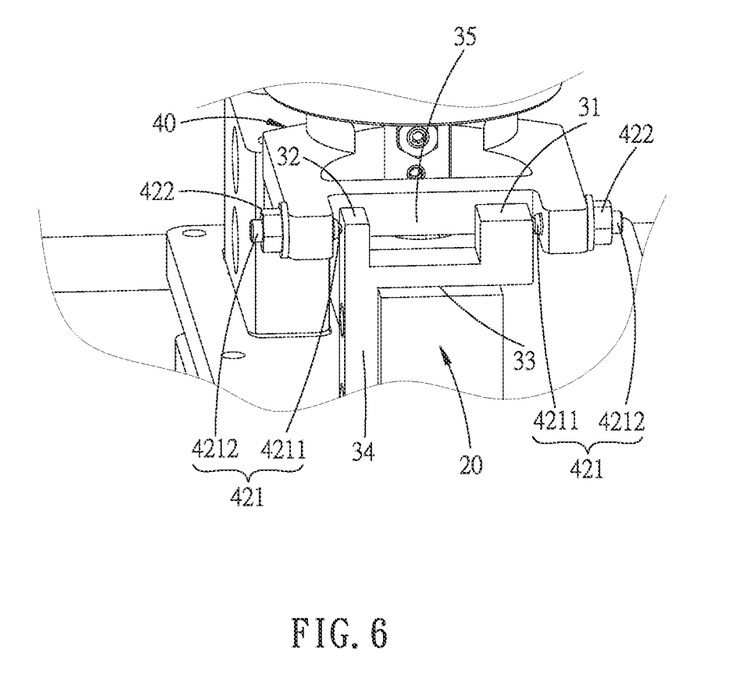
FIG. 6 is another locally enlarged perspective view of the torque detection device in accordance with the preferred embodiment of the present invention.
Figure 7:
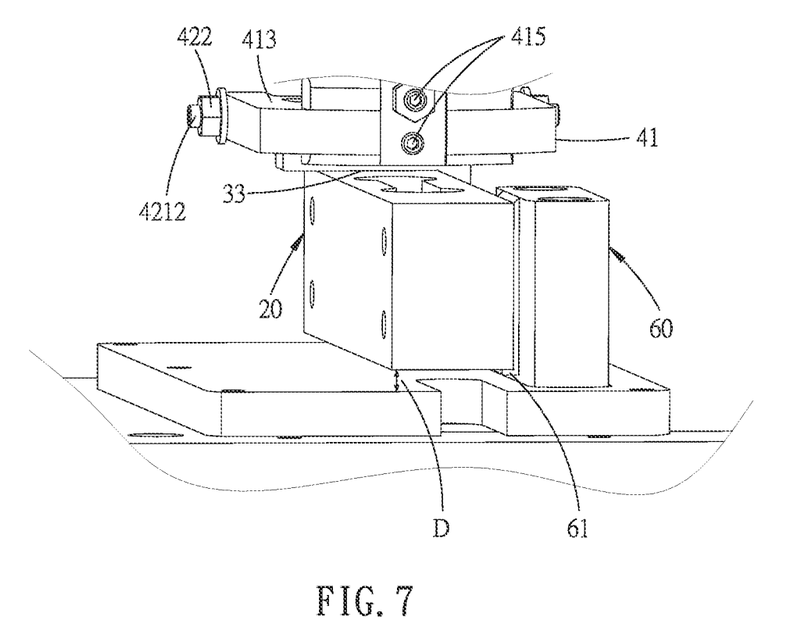
FIG. 7 is another locally enlarged perspective view of the torque detection device in accordance with the preferred embodiment of the present invention.
Figure 8:
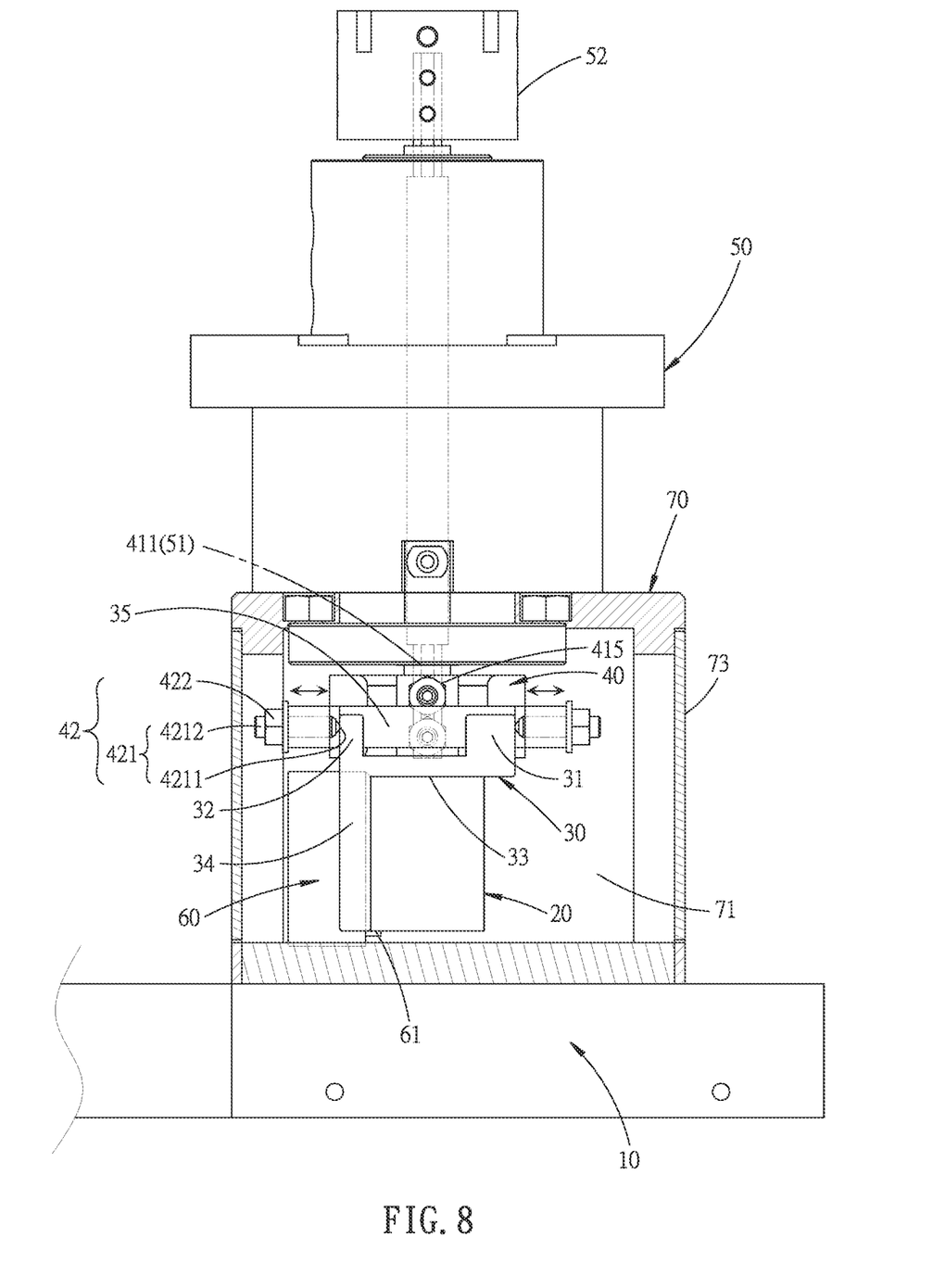
FIG. 8 is a cross-sectional view of the torque detection device as shown in FIG. 1.
Figure 9:
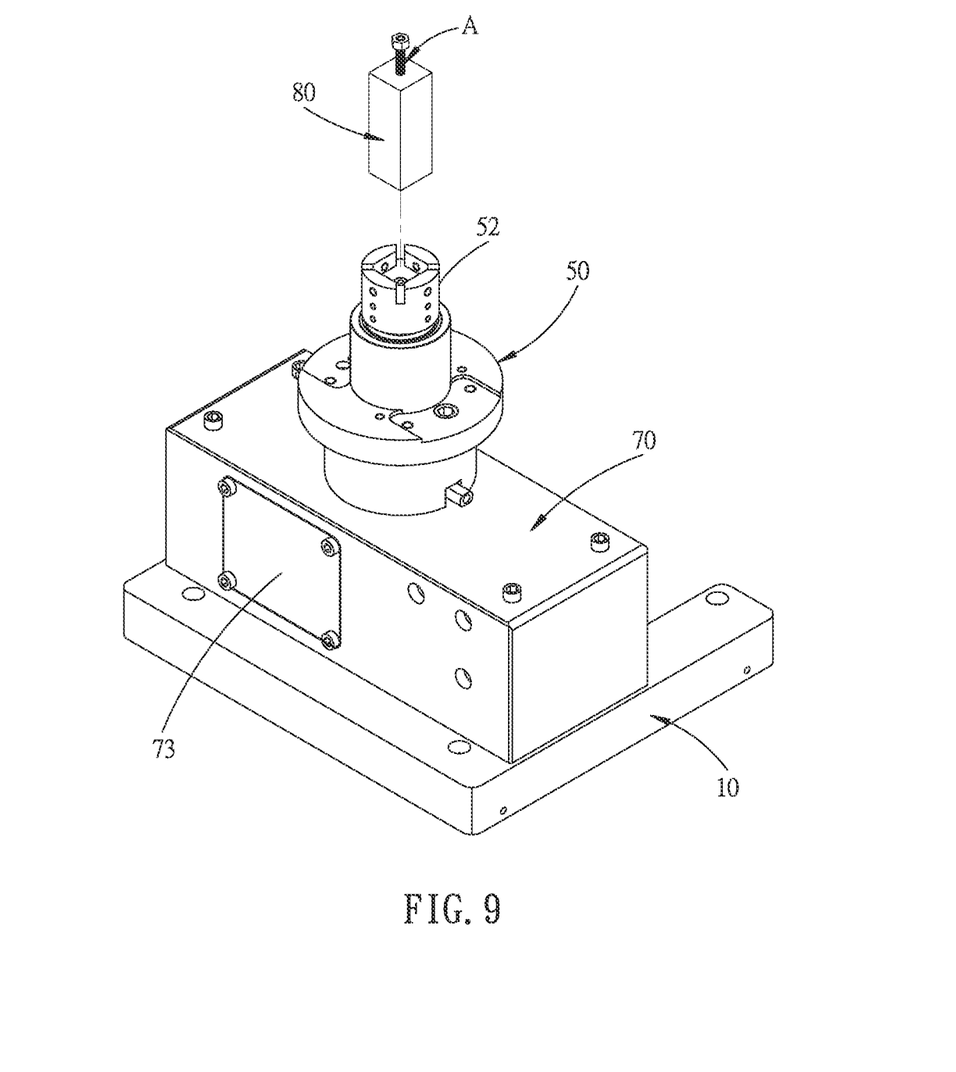
FIG. 9 is a perspective view showing a detected workpiece is to be mounted on the torque detection device in accordance with the preferred embodiment of the present invention.
Figure 10:
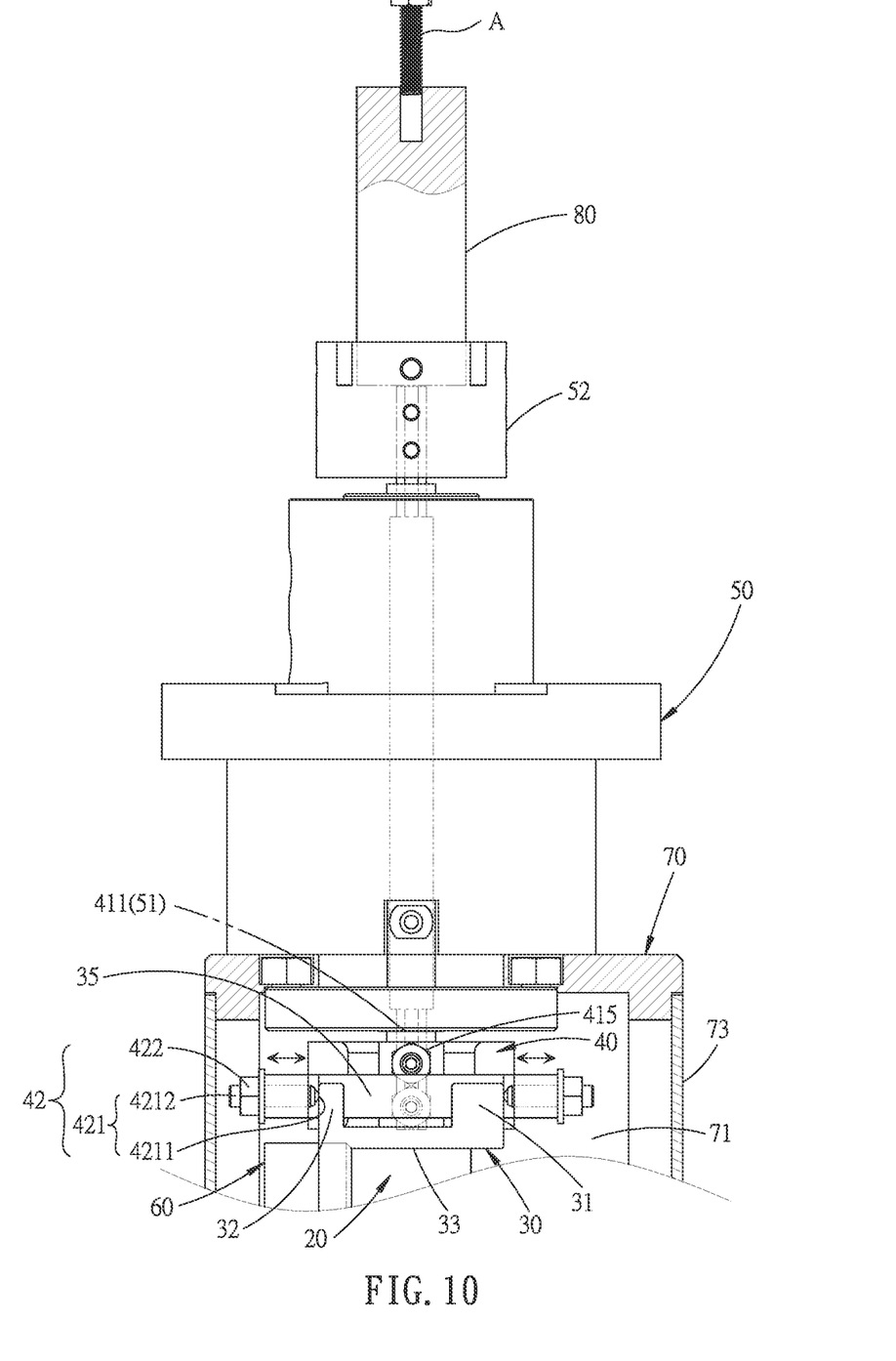
FIG. 10 is a schematic cross-sectional view showing operation of the torque detection device for the detected workpiece.

In practical operation, referring to FIGS. 9 and 10 with reference to FIGS. 1-8, the fixture 80 is mounted on the mounting portion 52 of the drive module 50, and the detected workpiece A is placed into the fixture 80. The drive module 50 is used to drive and pivot the detected workpiece A. The transmission module 40 is driven by the pivotal torque of the drive module 50 to perform a corresponding action. In such a manner, the pivotal torque of the drive module 50 is transmitted from the pivot axis 411 to the first transmission arm 412 and the second transmission arm 413, and drives the rolling member 4211 of the torque transmission part 421 simultaneously so as to respectively press the first extension wall 31 and the second extension wall 32 of the push member 30 reciprocatingly. Thus, the push member 30 receives and transmits the reciprocating force or pressure from the rolling member 4211 of the torque transmission part 421 to the load sensing member 20. The load sensing member 20 senses the reciprocating force from the push member 30 and produces a sensing signal which is sent to an external electronic device, such as a computer, a smart phone or the like, so as to derive the maximum static friction torque of the detected workpiece A.

Figure 11:
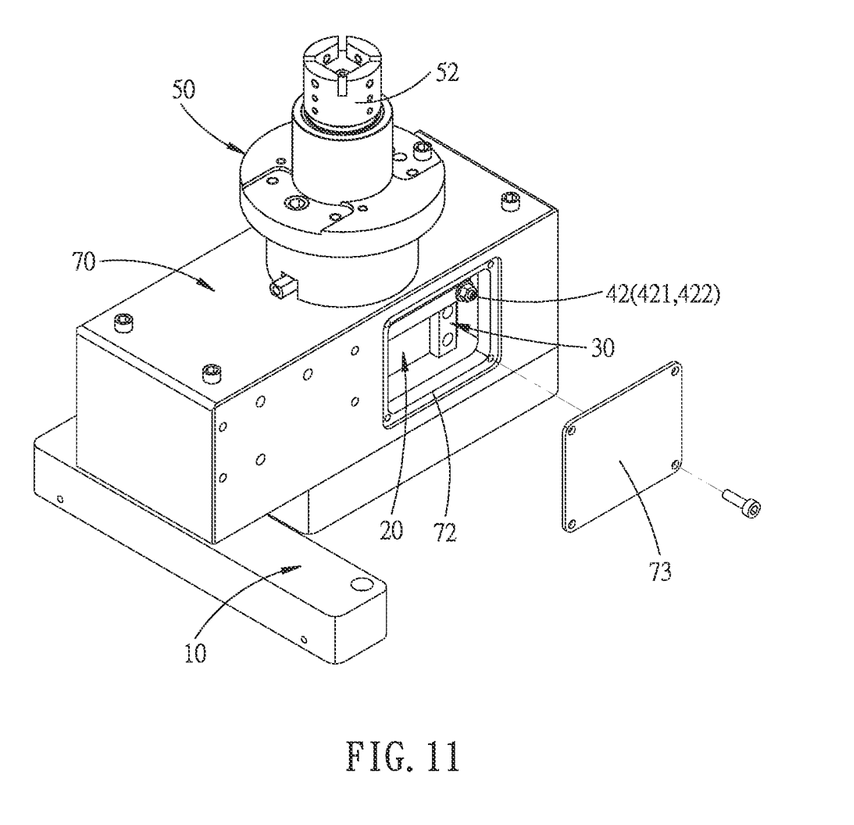
FIG. 11 is a perspective view showing a cover plate is removed from the torque detection device.

It is appreciated that, the rolling member 4211 is a rolling ball pressing the first extension wall 31 and the second extension wall 32 of the push member 30 respectively, to reduce the residual force produced during operation of the torque transmission part 421, so that the load sensing member 20 detects the torque exactly and accurately. In comparison, the conventional bearing has a large contact area and produces more residual force so that the load sensing member 20 cannot detect the torque exactly and accurately. Referring now to FIG. 11 with reference to FIGS. 1-8, a torque clearance is produced between the push member 30 and the two adjustable transmission sets 42 due to multiple operations during a long-term utilization so that the torque measurement easily produces errors. At this time, the two cover plates 73 are removed from the housing 70 to expose the at least two openings 72. The at least two openings 72 correspond to the push member 30 and the transmission module 40 to facilitate the operator adjusting the two adjustable transmission sets 42. In such a manner, the operator drives (or rotates) the drive adjusting member 422 to adjust the tightness (or clearance) between the rolling member 4211 of the torque transmission part 421 and the first extension wall 31 and the second extension wall 32 of the push member 30. The external electronic device performs a mathematical operation according to the clearance adjustment extent between the rolling member 4211 and the first extension wall 31 and the second extension wall 32 to eliminate the additional torque clearance, so that so that the load sensing member 20 can detect the torque exactly and accurately. The two cover plates 73 cover the at least two openings 72 after adjustment.

Accordingly, the two adjustable transmission sets 42 of the transmission module 40 are operated easily and conveniently to eliminate the additional torque clearance efficiently. In addition, the transmission module 40 is designed to have an equal torque transmission structure so that the torque transmission will not produce a displacement deflection, thereby increasing the precision and decreasing the error of the torque measurement.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A torque detection device, comprising:
a base;
a load sensing member is arranged on the base;
a push member has a first extension wall and a second extension wall arranged symmetrically, the first extension wall and the second extension wall are connected and form an abutting portion resting on the load sensing member;
a transmission module includes a body and two adjustable transmission sets mounted on two sides of the body, each of the two adjustable transmission sets includes a torque transmission part and a drive adjusting member, the torque transmission part corresponds to an outer wall of the first extension wall and an outer wall of the second extension wall, the drive adjusting member adjusts a tightness between the torque transmission part and the outer wall of the first extension wall and the outer wall of the second extension wall of the push member; and
a drive module is coupled to the transmission module; wherein:
the transmission module is driven by the drive module to perform an action, the torque transmission part of the transmission module applies a force to push and press the push member reciprocatingly, the push member transmits the force of the torque transmission part to the load sensing member.

2. The torque detection device as claimed in claim 1, wherein a third extension wall extends vertically from the second extension wall and is secured to a side of the load sensing member.

3. The torque detection device as claimed in claim 1, wherein the body has a pivot axis and has a first transmission arm and a second transmission arm extending from two sides of the pivot axis, the drive module has a drive shaft connected with the pivot axis of the body, and the two adjustable transmission sets are arranged between the first transmission arm and the first extension wall and arranged between the second transmission arm and the second extension wall.

4. The torque detection device as claimed in claim 1, wherein the first extension wall has a thickness more than that of the second extension wall.

5. The torque detection device as claimed in claim 1, wherein a fixed member is fixed between the base and the load sensing member, the fixed member is provided with a support portion bearing a bottom of the load sensing member, and a distance is defined between the load sensing member and the base.

6. The torque detection device as claimed in claim 1, wherein a housing has a receiving space, the housing covers the base, and the load sensing member, the push member, the transmission module, and partial of the drive module are housed in the receiving space.

7. The torque detection device as claimed in claim 6, wherein the housing includes at least two openings, two cover plates, and a mounting hole, the at least two openings are connected to the receiving space and correspond to the push member and the transmission module, and the drive module has a drive shaft extending through the mounting hole and connected with the transmission module.

8. The torque detection device as claimed in claim 1, wherein the drive module has a drive shaft, the body further includes at least one retaining hole and at least one retaining member, and the at least one retaining member extends through the at least one retaining hole and is secured to the drive shaft.

9. The torque detection device as claimed in claim 1, wherein the torque transmission part consists a rolling member and a driven adjusting member which are connected, the rolling member respectively rests on the outer wall of the first extension wall and the outer wall of the second extension wall, the driven adjusting member matches the drive adjusting member, an adjustment extent between the driven adjusting member and the drive adjusting member is equal to a tightness between the rolling member and the first extension wall and the second extension wall of the push member.

10. The torque detection device as claimed in claim 1, wherein the drive module includes a mounting portion, a fixture is mounted on the mounting portion, a detected workpiece is mounted on the fixture.

\* \* \* \* \*